United States Patent [19]

Pittinger, Sr. et al.

[11] 4,118,864
[45] Oct. 10, 1978

[54] INCREMENTAL FEED MEANS AND METHOD FOR FILAMENT-TRIMMER FILAMENTS

[76] Inventors: Charles B. Pittinger, Sr., P.O. Box 68, Rte. 1, Weatherford, Tex. 76086; Charles B. Pittinger, Jr., 320 Cockeys Mill Rd., Reisterstown, Md. 21136

[21] Appl. No.: 771,426

[22] Filed: Feb. 24, 1977

[51] Int. Cl.² .................. A01D 55/18; B26B 27/00
[52] U.S. Cl. .................................. 30/276; 56/12.7
[58] Field of Search ............. 30/276; 56/12.7, 295; 51/335

[56] References Cited

U.S. PATENT DOCUMENTS

| 2,709,323 | 5/1955 | Swan | 51/335 |
|---|---|---|---|
| 2,713,237 | 7/1955 | Monjar | 51/335 |
| 2,854,798 | 10/1958 | DeHaven | 51/335 |
| 3,928,911 | 12/1975 | Pittinger | 30/276 |

Primary Examiner—Jimmy C. Peters
Attorney, Agent, or Firm—John F. McClellan, Sr.

[57] ABSTRACT

A filament incremental feed for vegetation filament trimmers of the hollow shaft or similar type in which a free-end of filament is swung as a cutting length from the lower end of the hollow shaft and replaced as worn by pulse feed; the feed includes in a preferred embodiment a vertical spindle mounting a worm pinion coaxially on the hollow-shaft at the top of the hollow shaft. The worm pinion is free to rise and to rotate relative to the spindle when retarded in rotation by friction, as by a friction bar engaging an upward extension of the gear pinion which has a friction surface. Plural spools, in the preferred embodiment, rotationally mounted on substantially horizontal axes on a yoke on the hollow shaft engage the worm pinion with gear teeth around the flanges of the spools. The lead angle of the worm pinion provides a mechanical advantage preventing rotation of the worm gear by the spool geared flanges.

In operation, in the preferred embodiment, downward pull of respective filaments wound on the respective spools caused by centrifugal force at the free cutting-ends of the filaments forces the worm pinion downward against a shoulder and no filament feeds from the spools. To feed filament, the friction bar is engaged with the worm pinion upward extension, causing the worm pinion to rotate in climbing direction relative to the spool geared flanges. This upward unscrewing of the worm pinion ceases when a reduced-diameter section of the upward extension of the worm pinion reaches the level of the friction bar, clearing the friction surface from the friction bar. On retraction of the friction bar the filament pull forces the spools to rotate in feeding direction, feeding filament and forcing the worm pinion down to initial position against the shoulder at which point feed of the filament increment stops. In other embodiments pulse feed is provided by coaction of a worm with spooling means flanges under vibratory urging.

26 Claims, 15 Drawing Figures

INCREMENTAL FEED MEANS AND METHOD FOR FILAMENT-TRIMMER FILAMENTS

This invention relates generally to vegetation filament-trimmers and specifically to an incremental filament feed for vegetation filament-trimmers.

Reference is made to U.S. Pat. No. 3,895,440 granted to Charles B. Pittinger, Jr. on July 23, 1975 for DISK FOR FILAMENT TRIMMERS disclosing an automatically deploying filament wound on a perforate plate used as a cutting head; to U.S. Pat. No. 3,664,102, granted May 23, 1972 to Walter Reber for Cutter Mechanism For Agricultural Machines Or Lawn Mowers, disclosing filament feed through plural passages in a filament trimmer, and to U.S. Pat. No. 3,928,911 granted Dec. 30, 1975 to Charles B. Pittinger, Jr., for HOLLOW-SHAFT FEED FILAMENT TRIMMER, disclosing pinch type control of feed down a hollow shaft; however, none of the above disclosures is believed to make fair suggestion of the present invention, which employs a new approach based on gearing structure and method not found in the referenced old art filament-trimmers.

A principal object of the present invention is to provide an incremental filament feed for vegetation filament trimmers of the hollow shaft type which is adaptable for feeding one filament, or for exactly feeding plural filaments at the same time, which is absolutely dependable and at the same time economical, easy to load and compatible with most, if not all, configurations.

Further important objects of the present invention are to provide a filament feed as described which is relatively light in weight, simple in construction and operation, which requires the simplest linkage for control, which resists damage and jamming from abuse, wear and foreign materials such as vegetation, and which maintains dynamic balance at all times in plural spool embodiments, regardless of operating position during filament feeding and of amount of filament drawn from the spools.

In brief summary given for purposes of description only and not as limitation, the invention includes a filament trimmer driveshaft-carried filament spooling means co-acting with a member mounted for movement on the driveshaft axis to feed filament from the spooling means during trimmer operations.

The above and other objects and advantages will become more readily apparent on examination of the following description, including the drawings, in which like reference numerals refer to like parts:

FIG. 7a is a side elevational detail, partly in section, of a second embodiment;

FIG. 7b is a detail taken at 7b—7b, FIG. 7a;

FIG. 7c is an alternative detail similar to that of FIG. 7b;

FIG. 9b is a developed-view detail adapted from 9b—9b, FIG. 9a;

STRUCTURE, FIRST EMBODIMENT

Figure 1:
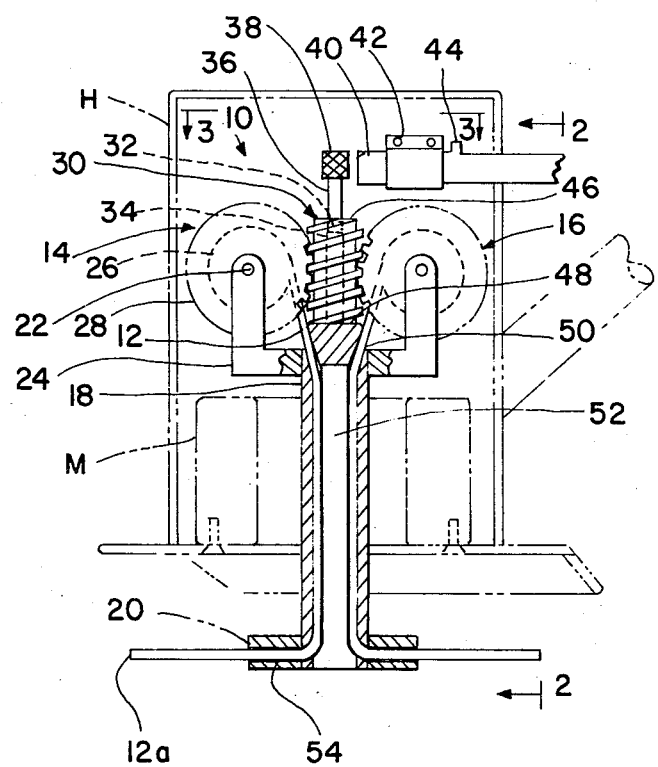
FIG. 1 is a side elevational detail of a first embodiment, partly in section.

FIG. 1 shows a schematically represented conventional filament trimmer housing H and motor M having the mechanism of this invention in embodiment 10, providing for feeding increments of one or more filaments 12 (two in this embodiment) which extend from over the top of respective spools 14, 16 down a hollow shaft 18 which is the motor driveshift and supported by the motor and out a cutter head 20. Each spool is mounted on a horizontal axle 22 and the spools are held on opposite sides of the vertical hollow shaft by a yoke 24 fixed to the hollow shaft.

Each spool has at one and preferably at both ends of the cylindrical portion 26 a flange 28 having gear teeth therearound.

The gear teeth engage a worm pinion 30 mounted freely by running fit of the worm pinion bore 32 with a spindle 34 coaxially extending upwardly from the hollow shaft. The upper end of the worm pinion has a necked-down or lesser diameter portion 36 surmounted by a brake drum 38 larger in diameter than the necked down section.

A brake shoe 40 is movably mounted by appropriate means such as fixed sleeve 42 so that it can be applied radially inwardly to the brake drum, but travel is limited by a stop schematically represented at 44, for reasons which will be explained. The height of the brake shoe is less than the vertical extent of the lesser diameter portion. The working or cylindrical surface of the brakeshoe is preferbly knurled or otherwise provided with a friction increasing surface.

The lesser diameter portion terminates at the lower end in a shoulder 46. The worm pinion lower end rests against a shoulder 48 of the hollow shaft.

Respective openings 50 adjacently below the spools receive the filaments for passage down the hollow shaft interior 52 to the schematically represented cutter head. The filaments conventionally turn outward in the cutting head in channels 54 provided and the free ends 12a emerge as cutting lengths extending several inches radially outward during normal operation.

Figure 2:
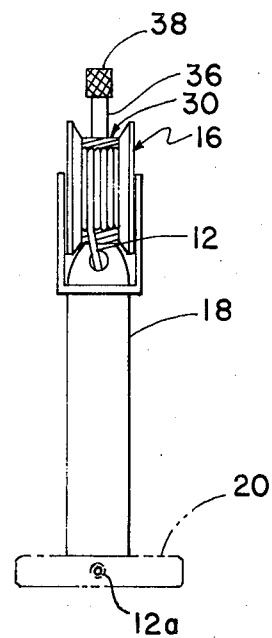
FIG. 2 is a view adapted from 2—2, FIG. 1.

FIG. 2 shows the compactly balanced aspect of details of the invention as viewed transverse to the spool axis.

Figure 3:
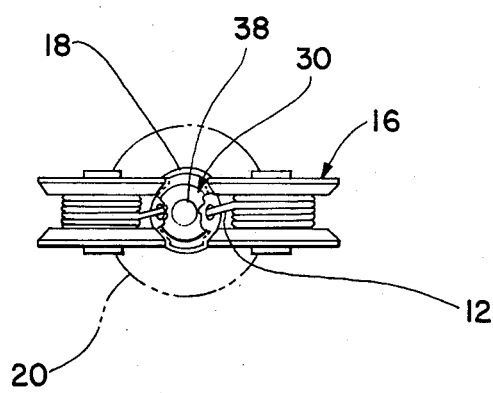
FIG. 3 is a view adapted from 3—3, FIG. 1.

FIG. 3 similarly shows details of the plan view.

OPERATION, FIRST EMBODIMENT

Figures 4, 5, 6:
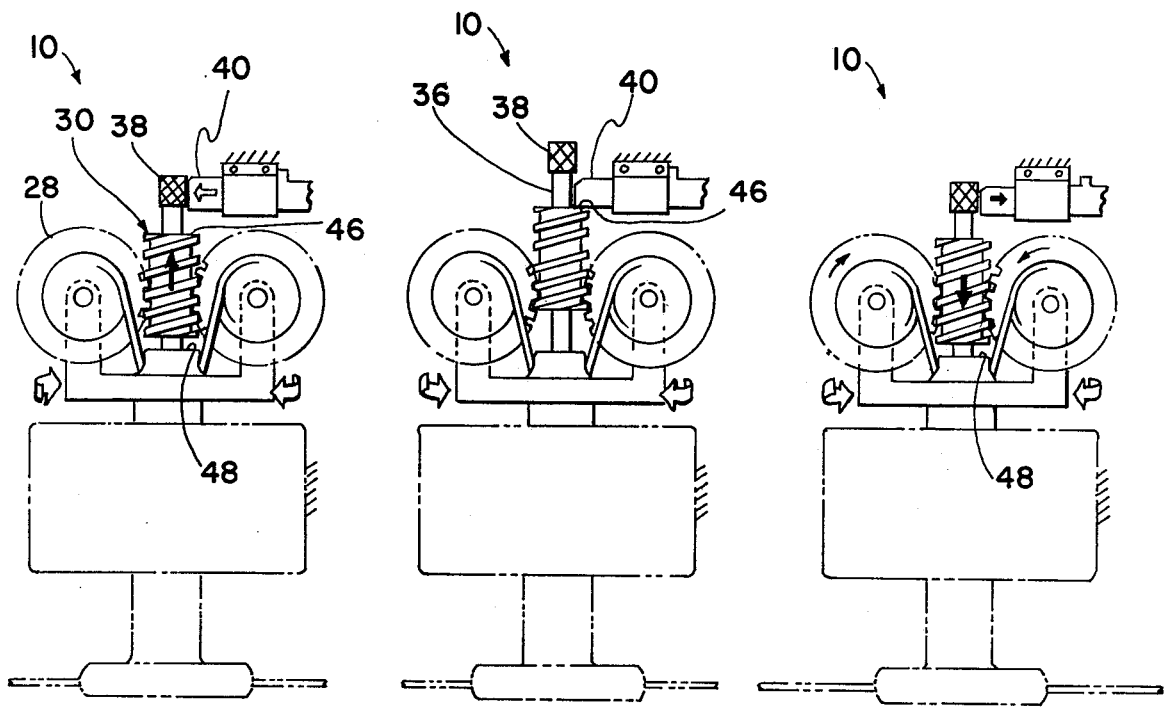
FIGS. 4, 5 and 6 are details adapted from FIG. 1 partly broken away and showing successive positions of operation.

FIGS. 4, 5 and 6 illustrate how, when filaments become frayed, broken-off or worn short during trimming operations, centrifugal force on the free lengths at the cutting head is caused to draw fresh filament in predetermined increments of length from over the spools down the hollow shaft.

With the exception of the brake, which is fixed to the housing, the drive motor rotates the entire mechanism 10 in the direction indicated by the broad arrows.

FIG. 4 shows the brake shoe 40 manually applied to the brakedrum 38, retarding rotation of the right-hand-thread worm pinion 30 which has begun to unscrew relative to the spool gear flanges 28, moving upward (arrow) as indicated by the gap at shoulder 48 of the hollow shaft. Downward pull of the filaments prevents the spools from rotating.

FIG. 5 shows the suceeding position in which the worm pinion has unscrewed to the maximum upward position in which worm pinion shoulder 46 strikes the brake shoe 40 limiting further rise; at this position the lesser-diameter portion 36 below the brake drum 38 is opposite the brake shoe,, the unscrewing friction vanishes and the worm pinion resumes the same rotational speed as the hollow shaft.

FIG. 6 shows the next step in which the brake shoe has been retracted (manually or by a spring not shown) permitting filament pull to rotate the spools, drawing the worm pinion down and feeding filament until stopped when the worm pinion comes to rest against the hollow shaft shoulder 48. Lead of the worm pinion thread is chosen such that the worm pinion cannot be rotated by the gear flanges.

At the usual operating speeds of several thousand revolutions per minute of filament trimmers, operation of this incremental feed is practically instantaneous, and can be repeated rapidly to feed positively as many increments as desired (small arrows), according to objects of the invention.

Braking may optionally be done by means of a pinch-type brake shoe.

It can be seen that in the embodiment shown and equivalent plural-spool embodiments rotating parts remain dynamically balanced about the hollow shaft at all times, operation of the worm pinion being axial, and increments fed from the spools being equal. The filaments remain separated at all times, eliminating twisting and jamming situations. Stresses on the spools are balanced in the embodiment illustrated, although if desired, more spools may be employed, each having a single gear flange, or otherwise adapted to minimize space requirements. For example, spools can be placed in over-and-under relation along the worm pinion. All can engage the worm pinion or some can engage it and drive others, and any said engagement can be at an angle other than precisely transverse to the hollow shaft axis.

For purposes of this disclosure it is to be understood that any simulation of a hollow-shaft giving similar effect is encompassed within the definition intended.

And further, in the term spindle, can be understood that shown or the equivalent in the form of a portion of the worm pinion extending downwardly in running fit with the hollow shaft, or other equivalent such as yoke mounting for the worm pinion.

It can be seen that assembly and adjustment are simple. The yoke is symmetrical about the axis as are the other parts, and is clamped, welded or pin-attached or screw-attached to the hollow shaft. The spindle is similarly attached or is turned as an integral part of the hollow shaft. The spool flange forms may be generated by conventional gear shaping, the production spool units then preferably being molded of suitable material which may be plastic. Assembly of the worm pinion is extremely simple in that it is merely slipped on the spindle with the brakeshoe assembly retracted.

Fit tolerances are large and uncritical.

Winding fresh filament can easily be done by retracting the brake shoe assembly, attaching fresh filament by means of a knot in a hole (not shown) or other conventional means, and freely spinning the spools by hand to wind-on the resupply of filament, or by replacing the empty spool with a full spool.

SECOND EMBODIMENT

Figures 7A, 7B, 7C:
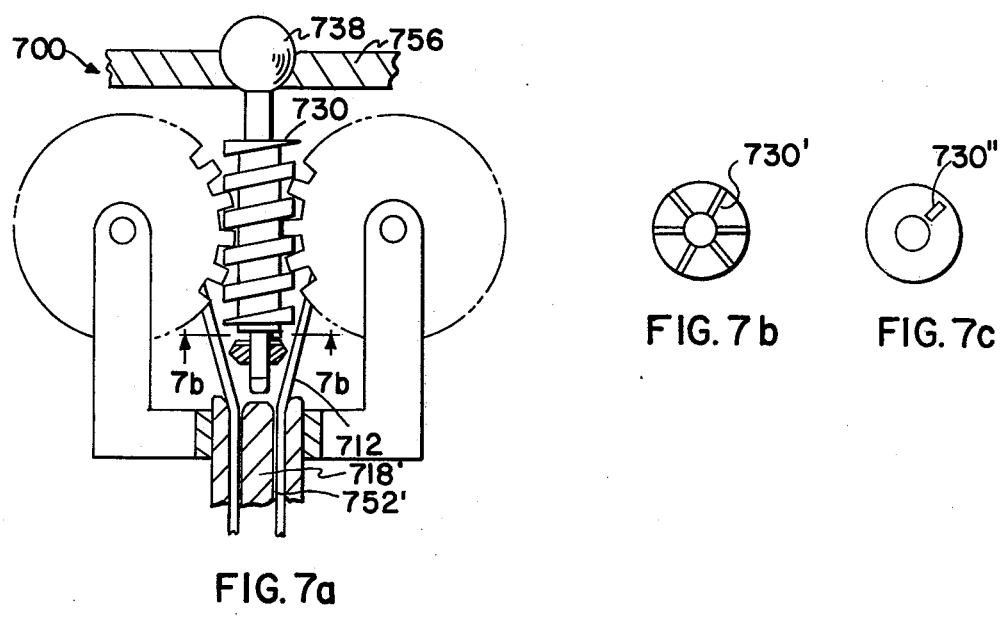

FIG. 7a shows a detail of an embodiment 700 generally similar in structure and operation to the first embodiment except that a smooth upwardly protrusive and accessible ball 738 is substituted, providing for manual braking of the worm 730 to produce pulses of filament feeding. Worm mount may be as shown. Also shown in this embodiment but applicable to the other embodiments is a divider 718' dividing the hollow in the hollow shaft into respective full-length longitudinal passages 752' for the individual filaments 712.

Clearance between the ball and the filament trimmer housing 756 prevents unwanted actuation. Tolerances are relieved by the simplicity, economy and reliability of this embodiment. Moment of inertia of element 738 is made a minimum, preferably; it may be a hollow plastic sphere.

FIG. 7b and 7c indicate alternative splined frictional structures 730', 730" which may advantageously be provided on the end of the worm 730, either of them preferably engaging a respective complementary frictional structure (not shown) on the end of the shaft 718 to increase friction and assure position of the worm relative to the shaft in the absence of axial movement. In other embodiments such as the next to be described embodiment where suitable similar frictional faces are provided friction increasers may similarly be employed between the worm and structure rotating with it. Magnitude of the spined structure described above sets a threshold level on the amplitude of motion necessary to feed filament.

THIRD EMBODIMENT

Figure 8:
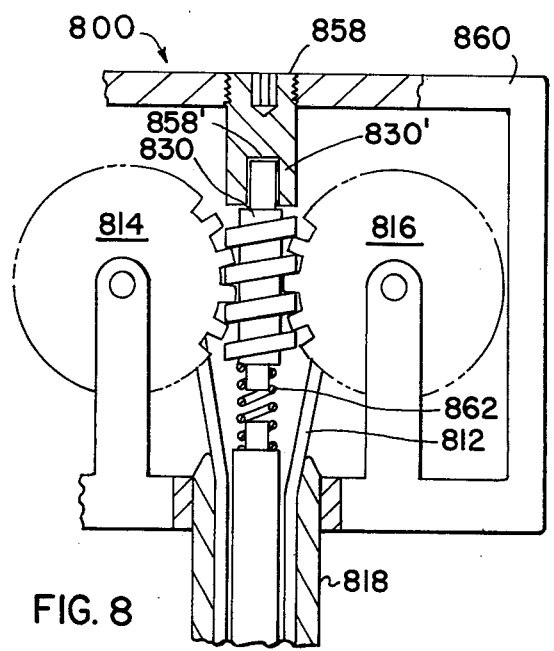
FIG. 8 is a side elevational detail partly in section, of a third embodiment.

FIG. 8 shows detail differences of a third embodiment 800 which continually feeds filament during operation in pulses of less amplitude than before described as result of deliberate vibrational-creeping provisions overcoming the braking effect of the worm and worm mounting. Worm 830 is slidably contained at integral projection 830' at the upper end in a recess 858' in a screw 858 preferably held adjustably axial to and rotating with the shaft 818 by an extension 860 of the yoke which may be in the nature of a frame. A resilient means such as spring 862 biases the worm away from the shaft. This permits pulsating counterbias of the filaments 812 during cutting operations to draw the spools 814, 816 around in unwinding mode and vibrate the worm into slow rotation, feeding filament in successive increments proportional to the amplitude of the vibrational increments of worm rotation. Increment-adjustment results from adjustment of the resilient compression of the spring by the adjustment screw, permitting feed to be proportioned to wear.

FOURTH EMBODIMENT

Figure 9A:
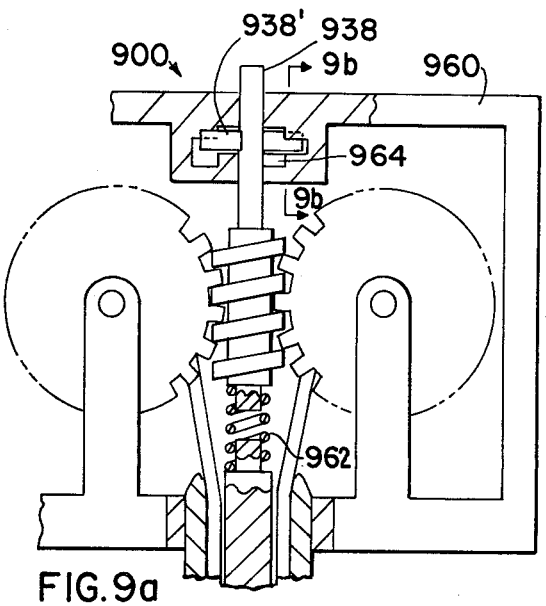
FIG. 9a is a side elevational detail, partly in section, of a fourth embodiment.

FIG. 9a shows detail differences of a fourth embodiment 900 generally similar to the previous embodiment except that a manually manipulable escapement track follower 938 comprising an upward extension of the worm through escapement follower lateral lugs 938' engages an endless incremental escapement track 964 in frame-like yoke-extension 960, axially of the shaft. Compression spring 962 biases the worm away from the end of the shaft. The mechanical advantage of the worm can be less than in previous embodiments to facilitate operation of this embodiment.

In operation, manual pressure downward (or the relations may be reversed, in which case pull upwards) advances the escapement one increment, causing one increment of retrograde relative rotation of the worm, feeding a proportional amount of filament from the spools. In a hand-held filament trimmer this adjustment may be conveniently actuated by hand or by foot. Importantly, line pull can also feed line by analogous action to other embodiments so that under heavy going, pulses and vibration can transmit back up the lines to feed line in proportion to wear, by advancing the escapement.

Figure 9B:
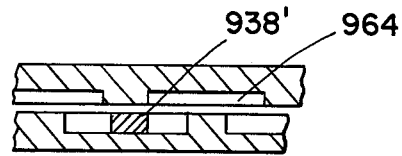

FIG. 9b is a developed view of the escapement relations, 938' being a portion of a lug and 964 being the escapement track.

FIFTH EMBODIMENT

Figure 10:
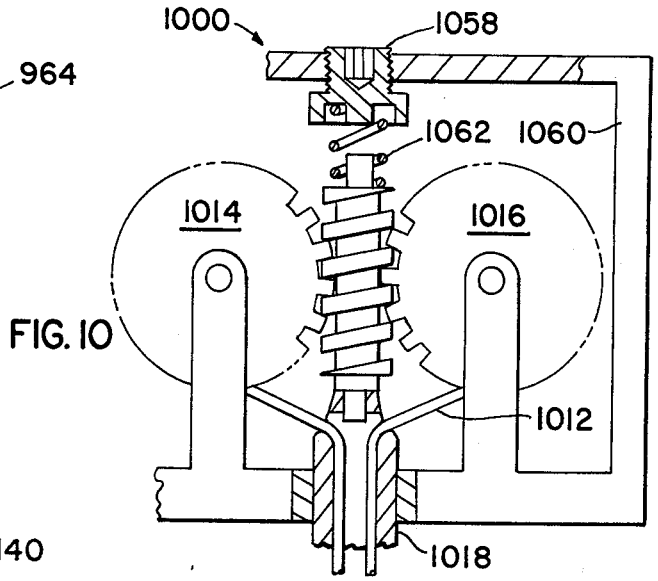
FIG. 10 is a side elevational detail, partly in section, of a fifth embodiment.

FIG. 10 shows detail differences of a fifth embodiment 1000 generally similar to the third embodiment in having an adjustment screw 1058 held in a yoke extension or equivalent structure 1060 in spaced axial relation with the end of the shaft 1018. The end of the shaft however slidably holds the worm as in the first embodiment, and a spring 1062 resiliently biases the worm away from the adjustment screw, preferably in opposition to the bias of the pulling force of the filaments 1012 which in this embodiment may be advantageously wound to emerge inwardly from beneath the spools 1014, 1016.

Vibrational incremental filament feeding overcoming frictional resistance is analogous to that of the third embodiment, and is conveniently adjustable toward automatic replenishment proportional to wear. The general arrangement of this embodiment permits design for a considerable interchangeability of parts with the third embodiment among others.

SIXTH EMBODIMENT

Figure 11:
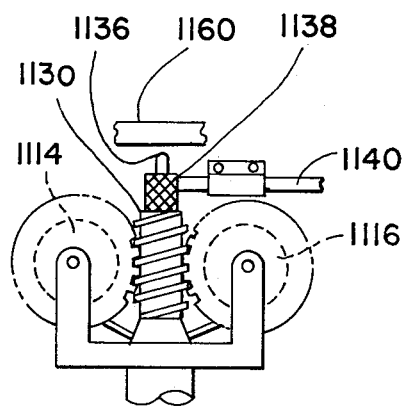
FIG. 11 is a side elevational detail of a sixth embodiment.

FIG. 11 details an embodiment similar to that just described except that the worm pinion 1130 is biased upward against a stop 1160 by the outboard-wound spools 1114, 1116, in operation. To feed filament, the brake shoe 1140 is advanced against the brake drum 1138, causing the worm pinion to have rotation relative to the spools, screwing the worm pinion down between the spools. As in the first embodiment the structure may incorporate a reduced-diameter portion 1136, in this case above the brake shoe, to limit braking. Upon cessation of braking the spools can rotate and feed filament by raising the worm pinion to the initial position.

SEVENTH EMBODIMENT

Figure 12:
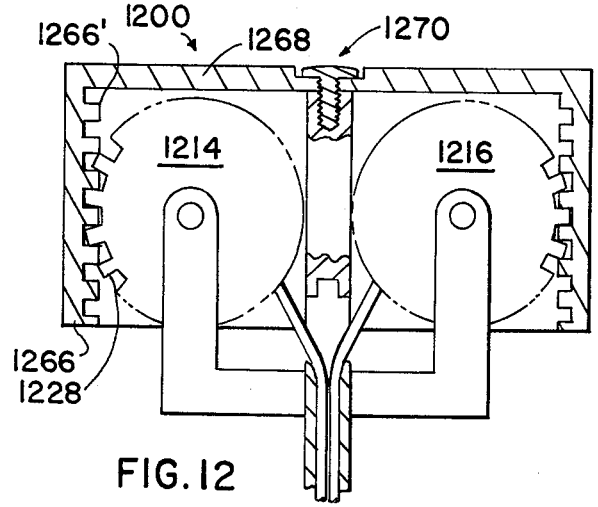
FIG. 12 is a side elevational detail, partly in section, of a seventh embodiment.

FIG. 12 shows details of a further vibrational-feed embodiment 1200 in which ring structure 1266 defines an internal worm thread 1266' and a supporting web 1268 having rotatable connection 1270 with the shaft. The thread may be a helical thread engaging the spools 1214, 1216 in the general manner previously described but on the outer side of the respective perimeters of the spool geared-flanges 1228.

Again, filament pulling force tending to rotate the spools exerts a bias preferentially applied because of the slope of the screw threads to vibrate the ring structure 1266 around, permitting the spools to rotate in unwinding direction feeding filament continually in vibrational pulses. The smooth, protective contours of this embodiment give safe, ready access while protecting the interior parts during operation. The outer part can be made relatively massive to capitalize on the high-rotational inertia if desired and the web can have resilience and serve as a spring in analogy to other embodiments.

This invention is not to be construed as limited to the particular forms disclosed herein, since these are to be regarded as illustrative rather than restrictive. For example, although the invention is for exposition recited in the context of a hollow shaft filament trimmer, it is to be understood to apply to other filament trimmers, without regard to exact routing of filament from storage to cutting length. It is, therefore, to be understood that the invention may be practiced within the scope of the claims otherwise than as specifically described.

What is claimed and desired to be secured by United States Letters Patent is:

1. In an incremental filament-feed for a rotating shaft filament trimmer employing cutting length adapted to produce filament pulling force during cutting operations, the improvement comprising: spooling means for storing filament in wound condition; means for unwinding said filament from the spooling means in pulses for feeding filament during cutting operations in response to said filament pulling force, including: means holding the spooling means on the shaft for rotation therewith, a worm, the spooling means having a portion engaging the worm for rotational constraint by the worm, and means for causing the worm to move axially along the shaft and rotatably about the shaft for releasing the spooling means to feed an increment of filament.

2. In a filament-feed as recited in claim 1, the worm having a brake portion, the means for causing including means mounting the worm movably along and in rotation about the shaft axis, a brake shoe, means locating the brake shoe in position for movably engaging the brake portion at a first position of the worm along the shaft axis and for clearing the brake portion at a second position of the worm along the shaft axis; and filament on the spooling means and passing therefrom to the cutting length, whereby filament feed is produced upon screwing of the worm along the shaft axis relative to the engaging portion of the spooling means followed by translation of the worm rotating the spooling means.

3. In a filament-feed as recited in claim 2, the spooling means comprising plural spools having respective axes parallel with each other and transverse to said shaft, the holding means spacing the spools about the shaft axis for balanced operation.

4. In a filament-feed as recited in claim 2, the spooling means including plural spools, and the means mounting the worm including a spindle upwardly extending from the shaft.

5. In a filament-feed as recited in claim 4, the filament feeding in over-the-spool direction inward toward and down the shaft.

6. In a filament-feed as recited in claim 4, said portion engaging the worm comprising a gear flange.

7. In a filament-feed as recited in claim 6, the means for clearing the brake portion comprising the worm having below the brake portion a portion of lesser diameter than the brake portion, and means locating the lesser diameter portion proximate the brake shoe in said second position.

8. In a filament-feed as recited in claim 7, the means for clearing further comprising the brake shoe having means stopping movement thereof short of the lesser diameter portion.

9. In a filament-feed as recited in claim 7, the means locating the lesser diameter portion comprising a shoulder on the worm for engaging the brakeshoe.

10. In a filament-feed as recited in claim 7, means defining the first position of the worm including a shoulder on the shaft.

11. In a filament-feed as recited in claim 6, the lead angle of the worm proportioned for preventing the gear flange from rotating the worm.

12. In a filament-feed as recited in claim 6, the shaft having an opening therein for receiving filament from said spools.

13. In a filament-feed as recited in claim 1, the means for causing including: means mounting the worm movably with respect to the shaft axis; and filament on the spooling means and passing therefrom to said cutting length.

14. In a filament-feed as recited in claim 13, said mounting of the worm movably with respect to the shaft axis including rotational and axial movement, the means for causing comprising braking means on the worm including a member upwardly protrusive for braking access thereto, and the spooling means comprising plural spools.

15. In a filament-feed as recited in claim 13, said mounting movably of the worm including rotational and axial movement, the worm having frictional means proximate an end thereof for preventing rotation of the worm in the absence of axial movement of the worm.

16. In a filament-feed as recited in claim 13, said worm movement including rotational and axial movement, the worm mounting means including: means, axial to the shaft, for slidably engaging an end of the worm; and means resiliently biasing the worm relative to the means for slidably engaging in a direction opposite said filament pulling force.

17. In a filament-feed as recited in claim 16, means connecting with the shaft the means for slidably engaging, and means for axially adjusting the means for slidably engaging relative to the shaft.

18. In a filament-feed as recited in claim 17, the means for axially adjusting comprising a threaded engagement.

19. In a filament-feed as recited in claim 17, the means for axially adjusting comprising an endless incremental escapement axially actuable for releasing the worm for rotation a predetermined amount relative to the shaft.

20. In a filament-feed as recited in claim 13, said mounting movably of the worm including rotational and axial movement, the means resiliently biasing including: a resilient member having first and second ends, the first end oriented for urging the worm toward the shaft, and means adjustably urging the second end toward the first end.

21. In a filament-feed as recited in claim 13, said movable mounting of the worm being in rotation, said means mounting including structure defining interior worm threads having a radial web having engagement with the shaft.

22. In a filament-feed as recited in claim 2, said second position being with the worm lower than at the first position.

23. In a filament-feed as recited in claim 1, a web having connection with the shaft, the worm comprising structure defining an internal gear having rotational connection with web.

24. In a filament-feed for a rotating shaft filament-trimmer producing pull on a filament during cutting operations, the improvement comprising: means for storing filament in wound condition including spooling means comprising at least one spool; means for unwinding filament from the storing means in pulses for feeding filament during cutting operations, including: a worm having a brake portion, means mounting the worm movably in rotation about the shaft axis and between a first and a second position along the shaft axis, a brake shoe, means movably holding the brake shoe at a location for operatively engaging said brake portion at the first position and for clearing the brake portion at the second position, a gearflange on said at least one spool, means mounting said at least one spool to the shaft and rotatably about a spool axis with the gear flange engaging the worm, and filament wound on said at least one spool and extending down the shaft and radially outward therefrom as a cutting length, whereby centrifugal force pulling the filament downward extends a fresh cutting length increment of filament upon braking causing the worm to screw itself to the second position without rotating the gear flange and cessation of braking causing the worm to return to the first position, rotating the gear flange.

25. In a filament-feed for a rotating shaft filament trimmer producing pull on a filament during cutting operations, the improvement comprising: means for storing filament in wound condition including a spool, means holding the spool for rotation with the rotating shaft, means for unwinding filament from the storing means in pulses for feeding filament during cutting operations, including: a substantially vertical spindle substantially coaxial with the shaft, a worm freely mounted on the spindle, the worm having a friction surface, filament on said spool, means for engaging the spool with the worm, means for retarding rotation of the worm and causing the worm to screw upwardly relative to the means for engaging, said pull causing the worm to descend upon cessation of rotational retardation, feeding filament by unwinding rotation of the spool.

26. In a filament-feed for attachment to a rotating filament trimmer shaft, the improvement comprising: means for storing filament in wound condition including a spool, means holding the spool to the rotating filament trimmer shaft for rotation with the rotating filament trimmer shaft, means for unwinding filament from the storing means in pulses for feeding filament during cutting operations including: a worm having a braking portion, means mounting the worm rotatably about and slidably along the shaft axis, filament wound on said spool and extending along the shaft, a gear flange affixed to the spool, means mounting the gear flange rotatably in engagement with the worm, means for causing rotation of the worm about the shaft axis relative to the spool flange for producing translation of the worm along the shaft axis, and means for causing return translation of the worm producing rotation of the spool and feeding an increment of filament from the spool.

* * * * *